US009428661B2

(12) United States Patent
Kawaguchi et al.

(10) Patent No.: US 9,428,661 B2
(45) Date of Patent: Aug. 30, 2016

(54) AQUEOUS INK COMPOSITION, INKJET RECORDING METHOD, AND COLORED MATERIAL

(71) Applicant: Nippon Kayaku Kabushiki Kaisha, Tokyo (JP)

(72) Inventors: Akira Kawaguchi, Tokyo (JP); Maiko Iuchi, Tokyo (JP); Toru Ishii, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/905,942

(22) PCT Filed: Jun. 12, 2014

(86) PCT No.: PCT/JP2014/065539
§ 371 (c)(1),
(2) Date: Jan. 18, 2016

(87) PCT Pub. No.: WO2015/019702
PCT Pub. Date: Feb. 12, 2015

(65) Prior Publication Data
US 2016/0152850 A1   Jun. 2, 2016

(30) Foreign Application Priority Data
Aug. 8, 2013  (JP) .................. 2013-164941

(51) Int. Cl.
| C09D 11/328 | (2014.01) |
| C09B 33/18 | (2006.01) |
| C09B 47/04 | (2006.01) |
| C09B 67/22 | (2006.01) |
| B41J 2/01 | (2006.01) |

(52) U.S. Cl.
CPC ................ *C09D 11/328* (2013.01); *B41J 2/01* (2013.01); *C09B 33/18* (2013.01); *C09B 47/04* (2013.01); *C09B 67/0041* (2013.01)

(58) Field of Classification Search
CPC ..... C09D 11/328; C09B 33/18; C09B 47/04; C09B 67/0041; C09B 67/0046
USPC ........................... 106/31.49, 31.52
See application file for complete search history.

(56) References Cited

U.S. PATENT DOCUMENTS

| 4,347,173 | A | * | 8/1982 | Merian ............... C09B 67/0033 106/413 |
| 5,439,517 | A | | 8/1995 | Yoshida et al. |
| 7,033,423 | B2 | * | 4/2006 | Rolly ..................... C09D 11/40 106/31.58 |
| 7,326,288 | B2 | * | 2/2008 | Matsui ................. C09D 11/328 106/31.52 |
| 7,503,967 | B2 | * | 3/2009 | Matsui ................. C09D 11/328 106/31.52 |
| 7,828,887 | B2 | * | 11/2010 | Rengaswamy ........ C09D 11/32 106/31.43 |
| 2008/0193660 | A1 | | 8/2008 | Matsui et al. |
| 2013/0079442 | A1 | * | 3/2013 | Ma ....................... C09D 11/328 524/88 |
| 2014/0299020 | A1 | | 10/2014 | Shimizu et al. |

FOREIGN PATENT DOCUMENTS

| JP | 63/046276 | * | 2/1988 |
| JP | 3178200 | | 4/2001 |
| JP | 2008-69331 | | 3/2008 |
| JP | 2013-32469 | | 2/2013 |
| WO | WO 2006/051850 | | 5/2006 |
| WO | WO 2013/035560 | | 3/2015 |

OTHER PUBLICATIONS

English translation of the Written Opinion of the International Search Authority mailed Sep. 16, 2014 for PCT/JP2014/065539; 6 pages.*
Acid Blue 90 (Brilliant Blue G) Product Information; Sigma-Aldrich; no date available; 2 pages.*

* cited by examiner

*Primary Examiner* — Helene Klemanski
(74) *Attorney, Agent, or Firm* — Knobbe Martens Olson & Bear LLP

(57) ABSTRACT

An aqueous black ink composition that can form black recorded images having excellent light resistance and water resistance, in particular, being hardly discolored by light. The aqueous ink composition contains, as colorants, at least both a compound represented by Formula (1) or its salt or a mixture thereof and a colorant having a maximum absorption wavelength λmax in a range of 560 to 680 nm and having a phthalocyanine skeleton. In Formula (1), $R_1$, $R_2$, $R_5$, $R_6$ and $R_7$ each independently represent, for example, a hydrogen atom, a carboxy group, a sulfo group, or a nitro group; $R_3$ and $R_4$ each independently represent, for example, a hydrogen atom or a sulfo group; and n represents 0 or 1.

10 Claims, No Drawings

AQUEOUS INK COMPOSITION, INKJET RECORDING METHOD, AND COLORED MATERIAL

CROSS-REFERENCE TO RELATED APPLICATIONS

This application is the U.S. National Phase under 35 U.S.C. §371 of International Application PCT/JP2014/065539, filed Jun. 12, 2014, which was published in Japanese as WO2015/019702 on Jun. 12, 2014, which claims priority to Japanese Patent Application No. 2013-164941, filed Aug. 8, 2013, the entire contents of which are incorporated herein by reference.

TECHNICAL FIELD

The present invention relates to an aqueous black ink composition, an inkjet recording method using the composition, and a colored material.

BACKGROUND ART

A method of recording with an inkjet printer, which is one of typical methods among a variety of color recording methods, performs recording by forming ink droplets and making the droplets adhere to a variety of record receiving materials (such as paper, a film, or fabric). In this method, the recording head and the record receiving material are not brought into direct contact with each other. The method therefore has advantages that the method generates little noise and is quiet and that miniaturization and speeding up of inkjet printers can be readily achieved. Accordingly, the method has been rapidly being spread in recent years and is expected to be further popularized in the future.

The recent development of inkjet technologies has remarkably accelerated the printing speed in inkjet printing, and inkjet recording has been proposed to be used in commercial printing or at offices. In such cases, the printing media are generally plain paper having no ink-receiving layer, which has problems in hue, light resistance, and water resistance in many cases, compared to inkjet exclusive paper having an ink-receiving layer, and has been therefore highly desired to be improved.

A black ink is an important ink that is used in both mono-color and full-color images. However, there are many technical barriers in the development of a colorant having neutral hue in both a deep-color region and a light-color region, a high color density, and also excellent fastness properties, and inks showing sufficient performance have been hardly provided in spite of active research and development. Accordingly, a black ink is generally prepared by mixing a plurality of various colorants. An ink prepared by mixing a plurality of colorants is, however, prone to cause problems, such as a change in hue depending on the record receiving material and an increase in discoloration due to light and water, compared to an ink prepared from a single colorant.

The "discoloration" is, in general, known to be capable of being evaluated separately as two different indices. One index is "fade in color", which is evaluated as a change in print density. The other index is "change in color", which is evaluated as a change ($\Delta E$) in hue. In these indices, the latter, "change in color", is notably observed in an ink prepared from a plurality of colorants and is observed even by visual inspection as a significant degradation in a recorded image. It is therefore highly demanded to reduce such a change in color.

For example, PTL 1 proposes a black ink containing a black dye and further another dye for adjusting the color, but a product sufficiently meeting the requirements of the marketplace has not been provided yet.

In addition, the dyes represented by Formula (1) described in the present specification are disclosed in PTLs 2 to 5. These dyes, however, have not sufficiently solved the above-described problems in light resistance and water resistance.

CITATION LIST

Patent Literature

PTL 1: Japanese Patent No. 3178200
PTL 2: International Publication No. WO2006/051850
PTL 3: International Publication No. WO2013/035560
PTL 4: Japanese Unexamined Patent Application Publication No. 2008-69331
PTL 5: Japanese Unexamined Patent Application Publication No. 2013-32469

SUMMARY OF INVENTION

Technical Problem

It is an object of the present invention to provide an aqueous black ink composition that can form black recorded images having excellent light resistance and water resistance, in particular, being hardly discolored by light.

Solution to Problem

The present inventors have diligently studied and as a result, have found that the above-mentioned problems can be solved by an aqueous ink composition at least comprising, as colorants, both a compound represented by the specific following Formula (1) or its salt or a mixture thereof and a colorant having a maximum absorption wavelength λmax in a range of 560 to 680 nm and having a phthalocyanine skeleton, and have accomplished the present invention.

That is, the present invention relates to the following 1) to 10) aspects:

1) An aqueous ink composition at least comprising, as colorants, both a compound represented by the following Formula (1) or its salt or a mixture thereof and a colorant having a maximum absorption wavelength λmax in a range of 560 to 680 nm and having a phthalocyanine skeleton, (1)

[Chem. 1]

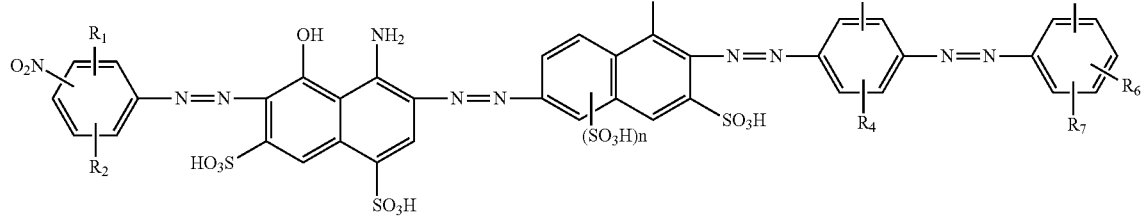

where $R_1$, $R_2$, $R_5$, $R_6$, and $R_7$ each independently represent a group selected from the group consisting of a hydrogen atom, a halogen atom, a cyano group, a hydroxy group, a carboxy group, a sulfo group, a sulfamoyl group, a nitro group, an alkoxy group optionally having a substituent, an alkylsulfonyl group optionally having a substituent, an alkyl group, an arylsulfamoylamino group optionally having a substituent, and an alkylcarbonylamino group;

$R_3$ and $R_4$ each independently represent a group selected from the group consisting of a hydrogen atom, a halogen atom, a cyano group, a sulfo group, a carboxy group, a nitro group, an alkoxy group optionally having a substituent, and an alkyl group; and n represents 0 or 1;

2) The aqueous ink composition according to aspect 1), further containing an azo colorant having a maximum absorption wavelength λmax of not higher than 580 nm and being different from both the compound represented by Formula (1) or its salt and the colorant having a phthalocyanine skeleton;

3) The aqueous ink composition according to aspect 1) or 2), further containing a compound represented by the following Formula (2) as a pH adjuster,

[Chem. 2]

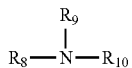

(2)

where, $R_8$, $R_9$, and $R_{10}$ each independently represent a hydrogen atom, an alkyl group, a hydroxyalkyl group, or a hydroxyalkoxyalkyl group;

4) The aqueous ink composition according to any one of aspects 1) to 3), wherein the colorant having a phthalocyanine skeleton is at least one dye selected from the group consisting of C.I. Acid Blue 249, C.I. Direct Blue 86, C.I. Direct Blue 87, and C.I. Direct Blue 199;

5) The aqueous ink composition according to aspect 1), wherein in Formula (1), $R_1$ represents a carboxy group or a sulfo group; $R_2$ represents a hydrogen atom; $R_6$ represents a nitro group, a carboxy group, or a sulfo group; and n represents 1;

6) The aqueous ink composition according to aspect 1), wherein in Formula (1), $R_1$ and $R_3$ each represent a sulfo group; $R_4$ represents a hydrogen atom; $R_5$ represents a hydrogen atom or a nitro group; $R_6$ represents a nitro group, a carboxy group, or a sulfo group; $R_7$ represents a hydrogen atom; and n represents 1;

7) An inkjet recording method comprising: discharging a droplet of the aqueous ink composition according to any one of aspects 1) to 6) according to a recording signal; and allowing the droplet to adhere to a record receiving material;

8) The inkjet recording method according to aspect 7), wherein the record receiving material is an information transfer sheet;

9) A colored material colored with the aqueous ink composition according to any one of aspects 1) to 6); and 10) An inkjet printer loaded with a container containing the aqueous ink composition according to any one of aspects 1) to 6).

Advantageous Effects of Invention

The present invention can provide an aqueous black ink composition that can form black recorded images having excellent light resistance and water resistance, in particular, being hardly discolored by light.

DESCRIPTION OF EMBODIMENTS

The present invention will now be described in detail.

Throughout the specification including examples, the terms "%" and "part(s)" are based on mass unless otherwise specified. Throughout the specification, the term "C.I." refers to "Color Index".

Throughout the specification, the phrase "compound represented by Formula (1) or its salt or a mixture thereof" is simply referred to as "compound represented by Formula (1)".

The compound represented by Formula (1) is a water-soluble black colorant.

In Formula (1), $R_1$, $R_2$, $R_5$, $R_6$, and $R_7$ each independently represent a group selected from the group consisting of a hydrogen atom, a halogen atom, a cyano group, a hydroxy group, a carboxy group, a sulfo group, a sulfamoyl group, a nitro group, an alkoxy group optionally having a substituent, an alkylsulfonyl group optionally having a substituent, an alkyl group, an arylsulfamoylamino group optionally having a substituent, and an alkylcarbonylamino group.

$R_3$ and $R_4$ each independently represent a group selected from the group consisting of a hydrogen atom, a halogen atom, a cyano group, a sulfo group, a carboxy group, a nitro group, an alkoxy group optionally having a substituent, and an alkyl group.

The alkoxy group optionally having a substituent is, for example, an alkoxy group optionally having a sulfo group and is preferably a C1-C6 alkoxy group optionally having a sulfo group and more preferably a C1-C4 alkoxy group optionally having a sulfo group.

The alkylsulfonyl group optionally having a substituent is, for example, an alkylsulfonyl group optionally having a hydroxy group and is preferably a C1-C6 alkylsulfonyl group optionally having a hydroxy group and more preferably a C1-C4 alkylsulfonyl group optionally having a hydroxy group.

The alkyl group is, for example, a linear, branched, or cyclic alkyl group and is preferably a linear or branched alkyl group and more preferably a linear alkyl group.

Examples of the alkyl group include linear C1-C6 alkyl groups, such as methyl, ethyl, n-propyl, n-butyl, n-pentyl, and n-hexyl; branched C1-C6 alkyl groups, such as isopropyl, isobutyl, sec-butyl, tert-butyl, isopentyl, and isohexyl; and cyclic C1-C6 alkyl groups, such as cyclopropyl, cyclobutyl, cyclopentyl, and cyclohexyl.

The arylsulfamoylamino group optionally having a substituent is, for example, a phenylsulfamoylamino group optionally having a substituent and is preferably a phenylsulfamoylamino group optionally having an alkyl group. Examples of the alkyl group are the same as those mentioned above including the preferred alkyl groups.

Examples of the alkyl site of the alkylcarbonylamino group are the same as those mentioned above including the preferred alkyl groups.

The halogen atom is, for example, a chlorine atom, a bromine atom, or an iodine atom and is preferably a chlorine atom or a bromine atom and is more preferably a chlorine atom.

Among the above, at least one of $R_1$ and $R_2$ is preferably a group other than a hydrogen atom. More preferably, one is a carboxy group, a sulfo group, or an unsubstituted alkoxy group, and the other is a hydrogen atom or a sulfo group. More preferably, one is a carboxy group or a sulfo group, and the other is a hydrogen atom. Particularly preferably, one is a sulfo group, and the other is a hydrogen atom.

Among these examples, preferably, "one" indicates $R_1$, and "the other" indicates $R_2$.

Among the above, at least one of $R_5$, $R_6$, and $R_7$ is preferably a group other than a hydrogen atom and is more preferably a group selected from a carboxy group, a sulfo group, and a nitro group. More preferably, one is a hydrogen atom; and one of the other two is a carboxy group, a sulfo group, or a nitro group, and the other is a hydrogen atom or a nitro group. Particularly preferably, one is a hydrogen atom; and one of the other two is a sulfo group, and the other is a hydrogen atom or a nitro group. Among these examples, preferably, "one" of "the other two" indicates $R_6$, and "the other" indicates $R_5$.

Among the above, at least one of $R_3$ and $R_4$ is preferably a group other than a hydrogen atom. More preferably, one is a sulfo group, an alkoxy group optionally having a substituent, or an alkyl group; and the other is a hydrogen atom, a sulfo group, or an alkyl group. More preferably, one is a sulfo group; and the other is a hydrogen atom, or one is an alkoxy group optionally having a substituent; and the other is an alkyl group. Particularly preferably, one is a sulfo group; and the other is a hydrogen atom. Among these examples, preferably, "one" indicates $R_3$, and "the other" indicates $R_4$.

In Formula (1), n is the number of substituents, the —$(SO_3H)_n$ groups, and represents 0 or 1, more preferably 1.

In Formula (1), the positions of substitution by the nitro group, $R_1$ to $R_7$, and the —$(SO_3H)_n$ group are not identified and are, for example, as follows.

[Positions of Substitution by $R_1$, Nitro Group, and $R_2$]

The positions of substitution by $R_1$, nitro group, and $R_2$ on the benzene ring are, when the position of substitution by the azo group bonded to the benzene ring is defined as the 1-position, for example, the following positions (a) to (c):

(a) $R_1$ is in the 2-position, the nitro group is in the 4-position, and $R_2$ is in the 5-position;

(b) $R_1$ is in the 4-position, the nitro group is in the 2-position, and $R_2$ is in the 5-position; and (c) $R_1$ is in the 2-position, the nitro group is in the 5-position, and $R_2$ is in the 4-position.

Among these positions, preferred are the positions (a) and (b), and more preferred is the position (a).

[Positions of Substitution by $R_3$ and $R_4$]

The positions of substitution by $R_3$ and $R_4$ on the benzene ring are, when the position of substitution by the azo group bonded to the benzene ring and bonded to the benzene ring having $R_5$ to $R_7$ is defined as the 1-position, preferably that $R_3$ is in the 3-position and $R_4$ is in the 6-position.

[Positions of Substitution by $R_5$, $R_6$, and $R_7$]

The positions of substitution by $R_5$, $R_6$, and $R_7$ on the benzene ring are, when the position of substitution by the azo group bonded to the benzene ring is defined as the 1-position, for example, the following positions (a) to (c):

(a) $R_5$ is in the 2-position, $R_6$ is in the 4-position, and $R_7$ is in the 5-position;

(b) $R_5$ is in the 3-position, $R_6$ is in the 5-position, and $R_7$ is in the 4-position;

(c) $R_5$ is in the 2-position, $R_6$ is in the 5-position, and $R_7$ is in the 4-position; and (d) $R_5$ is in the 3-position, $R_6$ is in the 4-position, and $R_7$ is in the 6-position.

Among these positions, preferred is the position (a).

[Position of Substitution by —$(SO_3H)_n$ Group]

The position of substitution by —$(SO_3H)_n$ group on the naphthalene ring is preferably the 5-position, when the positions of the substitution by the hydroxy group and the sulfo group bonded to the naphthalene ring are defined the 1-position and the 3-position, respectively.

In the compounds represented by Formula (1), the combination of the positions of substitution by substituents of which the substitution positions are not specified, including the groups represented by $R_1$ to $R_7$, the nitro group, and the "—$(SO_3H)_n$ group", is more preferably a combination of preferred positions and further preferably a combination of more preferred positions. A combination of further preferred positions and a combination of a preferred position and a more preferred position are the same.

For example, in Formula (1), a combination of $R_1$ representing a carboxy group or a sulfo group, $R_2$ representing a hydrogen atom, $R_6$ representing a nitro group, a carboxy group, or a sulfo group, and n representing 1 is preferred. Another preferred example is, in Formula (1), a combination of $R_1$ and $R_3$ each representing a sulfo group, $R_4$ representing a hydrogen atom, $R_5$ representing a hydrogen atom, a carboxy group, or a sulfo group, $R_6$ representing a nitro group, a carboxy group, or a sulfo group, $R_7$ representing a hydrogen atom, and n representing 1.

Examples of the compound represented by Formula (1) are shown in Tables 1 to 3. The compound represented by Formula (1) is, however, not limited thereto. In each table, ionic functional groups, such as a sulfo group and a carboxy group, are each shown in its free acid form.

TABLE 1

| Compound No. | Formula |
|---|---|
| 1 | $O_2N$—⟨benzene with $SO_3H$⟩—N=N—⟨naphthalene with OH, $NH_2$, $HO_3S$, $SO_3H$⟩—N=N—⟨naphthalene with OH, $SO_3H$, $SO_3H$⟩—N=N—⟨benzene with $HO_3S$⟩—N=N—⟨benzene⟩—$SO_3H$ |

TABLE 1-continued

| Compound No. | Formula |
|---|---|
| 2 | (chemical structure) |
| 3 | (chemical structure) |
| 4 | (chemical structure) |
| 5 | (chemical structure) |
| 6 | (chemical structure) |
| 7 | (chemical structure) |
| 8 | (chemical structure) |

TABLE 2

| Compound No. | Formula |
|---|---|
| 9 | |
| 10 | |
| 11 | |
| 12 | |
| 13 | |
| 14 | |

TABLE 2-continued

| Compound No. | Formula |
|---|---|
| 15 | (structure) |
| 16 | (structure) |

TABLE 3

| Compound No. | Formula |
|---|---|
| 17 | (structure) |
| 18 | (structure) |
| 19 | (structure) |
| 20 | (structure) |

TABLE 3-continued

| Compound No. | Formula |
|---|---|
| 21 | |
| 22 | |
| 23 | |
| 24 | |

Among the compounds represented by Formula (1), the compounds represented by formula (22), (23), or (26) are particularly preferred, and the compound represented by formula (22) is most preferred. These compounds particularly have advantageous effects in color developing properties, light resistance, ozone gas resistance, and water resistance.

[Chem. 3]

(22)

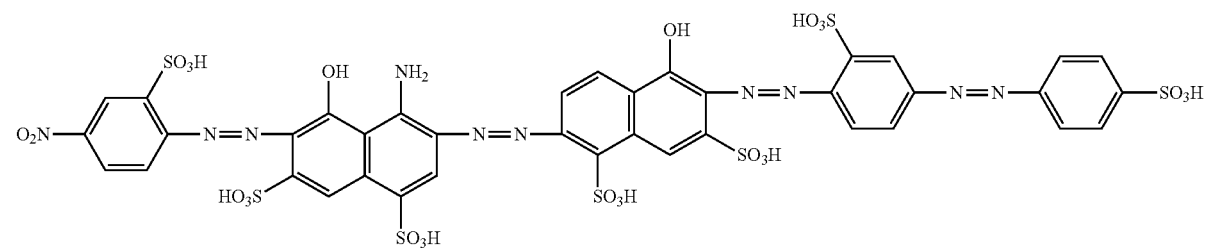

[Chem. 4]

(23)

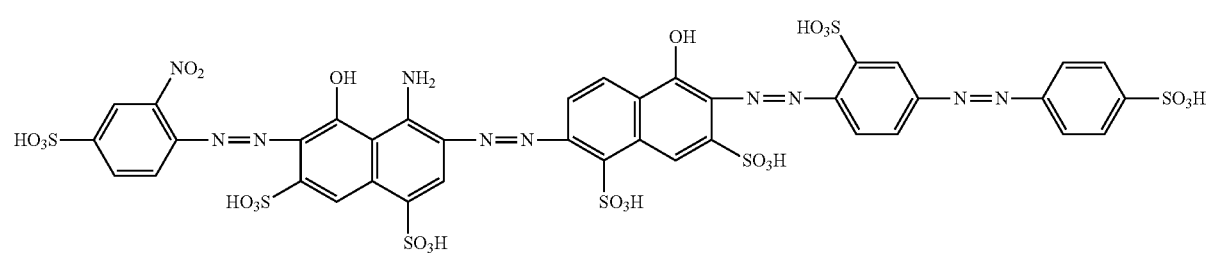

[Chem. 5]

(26)

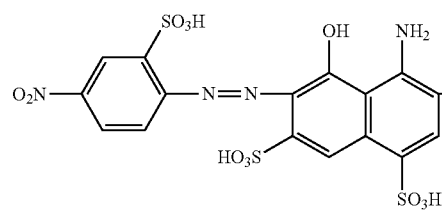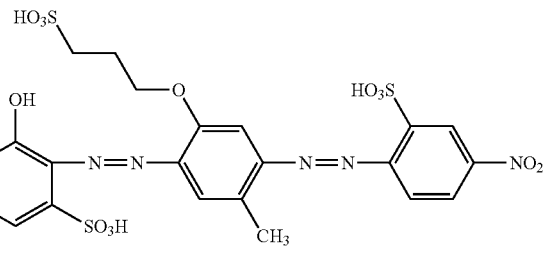

The compound represented by Formula (1) can be synthesized, for example, in accordance with the method described in PTL 3.

The compound represented by Formula (1) may be used in a salt form.

Examples of the salt of the compound represented by Formula (1) include salts formed with inorganic or organic cations. Examples of the inorganic salts include salts formed with cations of elements of the first group or second group of the periodic table and ammonium salts. Among these inorganic salts, preferred are salts of lithium, sodium, or potassium and ammonium salts.

Examples of the salts formed with organic cations include, but not limited to, salts formed with compounds represented by Formula (16).

[Chem. 6]

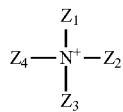

(16)

In Formula (16), $Z_1$, $Z_2$, $Z_3$, and $Z_4$ each independently represent a hydrogen atom, an alkyl group, a hydroxyalkyl group, or a hydroxyalkoxyalkyl group, provided that not all of $Z_1$, $Z_2$, $Z_3$, and $Z_4$ are hydrogen atoms.

The alkyl group represented by $Z_1$, $Z_2$, $Z_3$, or $Z_4$ in Formula (16) is preferably a C1-C4 alkyl group, and examples thereof include methyl, ethyl, n-propyl, isopropyl, n-butyl, isobutyl, sec-butyl, and tert-butyl.

Examples of the hydroxyalkyl group include hydroxy-C1-C4 alkyl groups, such as hydroxymethyl, hydroxyethyl, 3-hydroxypropyl, 2-hydroxypropyl, 4-hydroxybutyl, 3-hydroxybutyl, and 2-hydroxybutyl.

Examples of the hydroxyalkoxyalkyl group include hydroxy C1-C4 alkoxy-C1-C4 alkyl groups, such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among these hydroxyalkoxyalkyl groups, preferred are hydroxyethoxy-C1-C4 alkyl groups. Particularly preferred examples of the substituents are a hydrogen atom; methyl; hydroxy-C1-C4 alkyl groups, such as hydroxymethyl, hydroxyethyl, 3-hydroxypropyl, 2-hydroxypropyl, 4-hydroxybutyl, 3-hydroxybutyl, and 2-hydroxybutyl; and hydroxyethoxy-C1-C4 alkyl groups, such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl.

Examples of the group represented by $Z_1$, $Z_2$, $Z_3$, or $Z_4$ in Formula (16) are shown in Table 4. The compound represented by Formula (16) is, however, not limited thereto.

TABLE 4

| Compound No. | $Z_1$ | $Z_2$ | $Z_3$ | $Z_4$ |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |
| 1-11 | CH3 | —C2H4OH | CH3 | —C2H4OH |
| 1-12 | CH3 | —CH2CH(OH)CH3 | CH3 | —CH2CH(OH)CH3 |

Preferred examples of the salts formed with organic cations include monoethanolamine salts, diethanolamine salts, triethanolamine salts, monoisopropanolamine salts, diisopropanolamine salts, and triisopropanolamine salts.

The colorant having a maximum absorption wavelength λmax in a range of 560 to 680 nm and having a phthalocyanine skeleton means that the colorant having a phthalocyanine skeleton has a λmax (maximum absorption wavelength) in a range of 560 to 680 nm when the concentration of an aqueous solution containing the colorant is adjusted such that the aqueous solution has a pH in a range of 5.5 to 8.0 and an absorbance at the λmax in water in a range of 0.5 to 1.5. The colorant may be in a salt form or not in a salt form or may be a mixture of both.

Examples of the colorant having a phthalocyanine skeleton include the compounds represented by Formula (17) and salts thereof.

[Chem. 7]

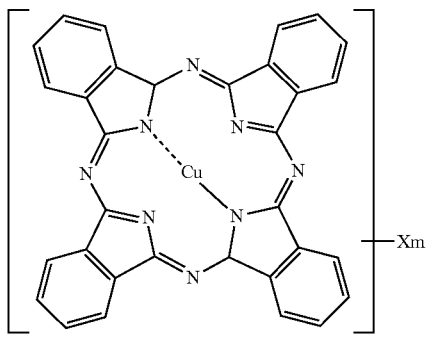

(17)

In Formula (17), Xs each independently represent a sulfo group, a sulfamoyl group, or a substituted alkyl group; m refers to the number of substituents Xs and represents an integer of 1 to 4.

Examples of the substituted alkyl group represented by X include alkyl groups having substituents selected from the group consisting of a sulfo group, a carboxy group, and a hydroxy group as the substituents. Among these substituted alkyl groups, preferred are alkyl groups having hydroxy groups as the substituents.

The colorant having a maximum absorption wavelength λmax in a range of 560 to 680 nm and having a phthalocyanine skeleton is preferably at least one dye selected from the group consisting of C.I. Acid Blue 249 and C.I. Direct Blue 86, 87, and 199. These dyes may be used alone or in a combination.

The aqueous ink composition may further contain an azo colorant having a maximum absorption wavelength λmax of not higher than 580 nm and being different from both the compound represented by Formula (1) and the colorant having a maximum absorption wavelength λmax in a range of 560 to 680 nm and having a phthalocyanine skeleton.

The maximum absorption wavelength λmax of the azo colorant is defined as in that described above and can be measured as in above.

The azo colorant usually has a maximum absorption wavelength λmax in a range of 580 nm or less, preferably 545 to 380 nm.

The azo colorant is used for adjusting the color tone of the image recorded with the aqueous ink composition. A single azo colorant may be used, or a plurality of azo colorants may be used. Although the colorant may be of any type, from the viewpoint of the dyeing affinity to record receiving materials, the colorant is preferably a reactive dye, an acidic dye, or a direct dye and more preferably a direct dye.

Examples of the reactive dye include yellow dyes, such as C.I. Reactive Yellow 84 and 95; orange dyes, such as C.I. Reactive Orange 5, 9, and 12; brown dyes, such as C.I. Reactive Brown 2 and 17; and red dyes, such as C.I. Reactive Red 3:1 and 24.

Examples of the acidic dye include yellow dyes, such as C.I. Acid Yellow 17, 38, 49, 59, 72, 110, 155, and 207; orange dyes, such as C.I. Acid Orange 51, 56, 67, 108, 122, and 149; blown dyes, such as C.I. Acid Brown 13, 226, 294, and 297; and red dyes, such as C.I. Acid Red 37, 111, 114, 119, 138, 249, 254, 256, 257, 266, 274, 276, 315, 318, and 366.

Examples of the direct dye include yellow dyes, such as C.I. Direct Yellow 86, 132, 142, and 162; orange dyes, such as C.I. Direct Orange 17 and 39; and red dyes, such as C.I. Direct Red 1, 6, 17, 23, 64, 80, 84, 122, 226, and 227.

Among these dyes, the colorant is preferably at least one dye selected from the group consisting of C.I. Direct Yellow 86, 132, and 142; C.I. Direct Orange 17 and 39; C.I. Direct Red 80, 84, and 227; and C.I. Acid Red 249 and 254. Preferably, the aqueous ink composition further containing such a colorant is apt to improve the color developing properties.

The aqueous ink composition may optionally contain C.I. Acid Black 2, in addition to the above-mentioned various dyes.

The content of C.I. Acid Black 2 is 0.1% to 5%, preferably 0.5% to 4%, and more preferably 1% to 3.5% based on the total mass of the aqueous ink composition.

In inkjet recording using the above-mentioned various colorants, inorganic impurities generally contaminating the purchased commercial products are preferably removed by purification treatment. Examples of the purification treatment include purification with a reverse osmosis membrane; and purification by stirring the source material of the colorant in a solvent mixture of an alcohol, such as methanol, and water, followed by filtration separation and drying. Examples of the inorganic impurities include chlorides (e.g., sodium chloride) and sulfides (e.g., sodium sulfate) of elements of the first group and/or second group of the periodic table. The purification is preferably performed to reduce the total amount of inorganic impurities to 100 ppm or less, more preferably 50 ppm or less, based on the total mass of the aqueous ink composition. The lower limit may be the detection limit of the detector, i.e., 0%.

The aqueous ink composition is prepared using water as the medium and may appropriately contain an ink preparation reagent as required within a range that does not impair the effects of the present invention.

Examples of the ink preparation reagent include water-soluble organic solvents, preservatives and fungicides, pH adjusters, chelating reagents, corrosion inhibitors, water-soluble ultraviolet absorbers, water-soluble polymers, dye solubilizers, antioxidants, and surfactants.

Examples of the water-soluble organic solvent include C1-C4 alkanols, such as methanol, ethanol, propanol, isopropanol, butanol, isobutanol, sec-butanol, and tert-butanol; carboxylic acid amides, such as N,N-dimethylformamide and N,N-dimethylacetamide; lactams, such as 2-pyrrolidone and N-methylpyrrolidin-2-one; cyclic ureas, such as 1,3-dimethylimidazolidin-2-one and 1,3-dimethylhexahydropyrimid-2-one; ketones or ketoalcohols, such as acetone, methyl ethyl ketone, and 2-methyl-2-hydroxypentan-4-one; cyclic ethers, such as tetrahydrofuran and dioxane; mono-, oligo-, or polyalkylene glycols or thioglycols having (C2 to C6) alkylene units, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, poly-ethylene glycol, polypropylene glycol, thiodiglycol, and dithiodiglycol; polyols (triols), such as glycerin and hexane-1,2,6-triol; (C1 to C4) alkyl ethers of polyalcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; γ-butyrolactone; and dimethyl sulfoxide. Among these water-soluble organic solvents, preferred are 2-pyrrolidone, isopropyl alcohol, glycerin, diglycerin, butyl carbitol, ethylene glycol, diethylene glycol, and propylene glycol; more preferred are 2-pyrrolidone, isopropyl alcohol, glycerin, and butyl carbitol. These water-soluble organic solvents may be used alone or in a combination of two or more thereof.

The content of the water-soluble organic solvent is usually 0% to 50%, preferably 25% to 50%, based on the total mass of the aqueous ink composition.

Examples of the fungicide include sodium dehydroacetate, sodium benzoate, sodium pyridinethione-1-oxide, p-hydroxybenzoic acid ethyl ester, and 1,2-benzisothiazolin-3-one, and salts thereof.

The content of the fungicide is preferably 0.02% to 1%.

Examples of the preservative include organic sulfur-based, organic nitrogen sulfur-based, organic halogen-based, haloallylsulfone-based, iodopropargyl-based, N-haloalkylthio-based, nitrile-based, pyridine-based, 8-oxyquinoline-based, benzothiazole-based, isothiazoline-based, dithiol-based, pyridineoxide-based, nitropropane-based, organic tin-based, phenol-based, quaternary ammonium salt-based, triazine-based, thiazine-based, anilide-based, adamantane-based, dithiocarbamate-based, brominated indanone-based, benzyl bromoacetate-based, and inorganic salt-based compounds. The organic halogen-based compound is, for example, sodium pentachlorophenol. The pyridineoxide-based compound is, for example, sodium 2-pyridinethiol-1-oxide. The inorganic salt-based compound is, for example, anhydrous sodium acetate. The isothiazoline-based compound is, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, or 2-methyl-4-isothiazolin-3-one calcium chloride. Examples of other preservative and fungicide include sodium sorbate and sodium benzoate.

The pH adjuster may be any one that can control the pH of an ink in a range of usually 5 to 12, preferably 7 to 12, and more preferably 7 to 10 without adversely affecting the resulting ink. Examples of the pH adjuster include alkanolamines, such as diethanolamine, triethanolamine, and N-methyldiethanolamine; hydroxides of alkali metals, such as lithium hydroxide, sodium hydroxide, and potassium hydroxide; ammonium hydroxide (ammonia); carbonates of alkali metals, such as lithium carbonate, sodium carbonate, sodium hydrogen carbonate, and potassium carbonate; and inorganic bases, such as potassium acetate, sodium silicate, and disodium phosphate.

The aqueous ink composition containing a compound represented by Formula (2) as the pH adjuster can prevent the pH from changing and does not cause changes in various physical properties and has excellent storage stability. Thus, the pH adjuster is preferably a compound represented by Formula (2).

In Formula (2), examples of the alkyl group, hydroxyalkyl group, and hydroxyalkoxyalkyl group represented by $R_8$, $R_9$, or $R_{10}$ are the same as those represented by $Z_1$, $Z_2$, $Z_3$, or $Z_4$ in Formula (16), including the preferred groups.

In the Formula, $R_8$, $R_9$, and $R_{10}$ are each preferably independently represent a hydrogen atom, an alkyl group, or a hydroxyalkyl group, specifically, for example, a hydrogen atom, a methyl group, an ethyl group, a hydroxymethyl group, or a hydroxyethyl group.

Examples of the preferred combination of compounds represented by $R_8$, $R_9$, and $R_{10}$ in Formula (2) are shown in Table 5.

TABLE 5

| Example No. | $R_8$ | $R_9$ | $R_{10}$ |
|---|---|---|---|
| 1 | —CH$_3$ | —CH$_3$ | —CH$_3$ |
| 2 | —CH$_2$CH$_3$ | —CH$_2$CH$_3$ | —CH$_2$CH$_3$ |
| 3 | —C$_2$H$_4$OH | —C$_2$H$_4$OH | —C$_2$H$_4$OH |
| 4 | H | —C$_2$H$_4$OH | —C$_2$H$_4$OH |
| 5 | H | H | —C$_2$H$_4$OH |
| 6 | H | H | H |
| 7 | —CH$_2$OH | —CH$_2$OH | —CH$_2$OH |
| 8 | H | —CH$_2$OH | —CH$_2$OH |

Examples of the chelating reagent include sodium ethylenediaminetetraacetate, sodium nitrilotriacetate, sodium hydroxyethylethylenediaminetriacetate, sodium diethylenetriaminepentaacetate, and sodium uracildiacetate.

Examples of the corrosion inhibitor include acidic sulfites, sodium thiosulfate, ammonium thioglycolate, diisopropylammonium nitrite, pentaerythritol tetranitrate, and dicyclohexylammonium nitrite.

Examples of the water-soluble ultraviolet absorber include sulfonated benzophenone compounds, benzotriazole compounds, salicylic acid compounds, cinnamic acid compounds, and triazine compounds.

Examples of the water-soluble polymer include polyvinyl alcohols, cellulose derivatives, polyamines, and polyimines.

Examples of the dye solubilizer include ε-caprolactam, ethylene carbonate, and urea. Among these solubilizers, urea is preferred.

The antioxidant can be, for example, an organic or metal complex fading inhibitor. Examples of the organic fading inhibitor include hydroquinones, alkoxyphenols, dialkoxyphenols, phenols, anilines, amines, indans, chromans, alkoxyanilines, and heterocycles.

Examples of the surfactant include known anionic, cationic, and nonionic surfactants.

Examples of the anionic surfactant include alkyl sulfonates, alkyl carbonates, α-olefin sulfonates, polyoxyethylene alkyl ether acetates, N-acylamino acids and salts thereof, N-acylmethyltaurates, alkyl sulfate polyoxyalkyl ether sulfates, alkyl sulfate polyoxyethylene alkyl ether phosphates, rosin acid soap, castor oil sulfate, lauryl alcohol sulfates, alkylphenol-type phosphates, alkyl-type phosphates, alkylallyl sulfonates, diethyl sulfosuccinate, diethyl hexane Lucille sulfosuccinate, and dioctyl sulfosuccinate.

Examples of the cationic surfactant include 2-vinylpyridine derivatives and poly(4-vinylpyridine) derivatives.

Examples of amphoteric surfactants include betaine lauryldimethylaminoacetate, betaine 2-alkyl-N-carboxymethyl-N-hydroxyethylimidazorium, coconut oil fatty acid amide propyldimethylaminoacetic acid betaine, polyoctylpolyaminoethyl glycine, and imidazoline derivatives.

Examples of the nonionic surfactants include ethers, such as polyoxyethylenenonylphenyl ether, polyoxyethyleneoctylphenyl ether, polyoxyethylenedodecylphenyl ether, polyoxyethylene oleyl ether, polyoxyethylene lauryl ether, polyoxyethylenealkyl ether, and polyoxyarylkyl alkyl ethers; esters, such as polyoxyethyleneoleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycols (for example, Surfynol® series 104, 105, 82, 420, 440, and 465 and Olfine® STG, manufactured by Nissin Chemical Industry, Co., Ltd.), such as 2,4,7,9-tetramethyl-5-decine-4,7-diol, 3,6-dimethyl-4-octine-3,6-diol, 3,5-dimethyl-1-hexin-3-ol. Among these surfactants, Surfynol® series 420, 440, are 465 are preferred, and Surfynol® 440 is particularly preferred. Throughout the specification, the superscript "®" means registered trademark.

In the production of the aqueous ink composition, the additives such as the colorant and the pH adjuster may be dissolved in any order. The water for preparing the aqueous ink composition preferably, such as ion deionized water and distilled water, contains less impurities.

Furthermore, after preparation of the aqueous ink composition, precise filtration using a membrane filter may be optionally performed to remove contaminants in the aqueous ink composition. In particular, the aqueous ink composition to be used in inkjet recording is preferably subjected to precise filtration. The filter used in the precise filtration usually has a pore diameter of 1 to 0.1 µm, preferably 0.8 to 0.1 µm.

The aqueous ink composition usually has a surface tension of 25 to 70 mN/m, preferably 25 to 60 mN/m.

At the same time, the aqueous ink composition usually has a viscosity of 30 mPa·s or less, preferably 20 mPa·s or less.

The aqueous ink composition can be used in a variety of fields, such as writing, aqueous printing, and information recording, and can be most preferably used in inkjet recording.

The inkjet recording generally uses an inkjet printer. The components of the inkjet printer, such as the ink nozzle, are not particularly limited and can be appropriately selected according to the purpose. For example, the inkjet printer can employ a known inkjet recording system, such as a charge control system utilizing an electrostatic attraction force to discharge an ink; a drop-on-demand system (pressure pulse system) utilizing a vibration pressure of an piezoelectric element; an acoustic inkjet system of converting electric signals into acoustic beams, and irradiating an ink with the beams to discharge the ink with the radiation pressure; and a thermal inkjet system, e.g., Bubble Jet (registered trademark) system, of heating an ink to form a bubble and utilizing the generated pressure. In the inkjet recording system, also included are a system of injecting a large number of small-volume droplets of an ink that is called photo ink having a small content of a coloring agent; a system of improving the image quality by using a plurality of inks having substantially the same hue but different contents of coloring agents; and a system using both a color ink and a colorless transparent ink.

The inkjet recording method performs recording by discharging droplets of the aqueous ink composition according to recording signals and allowing the droplets to adhere to a record receiving material.

A full-color image can be also recorded by using the aqueous ink composition as a black ink and also using magenta, cyan, and yellow ink compositions and optionally green, blue (or violet), and red (or orange) ink compositions. On this occasion, the color ink compositions can be used in inkjet recording by placing them in respective containers and loading the containers on an inkjet printer at prescribed positions, as in the container containing the aqueous ink composition.

The term "colored material" refers to a material colored with the aqueous ink composition by preferably the inkjet recording method.

Any material that can be colored with the aqueous ink composition can be used. The material is preferably a record receiving material, and examples thereof include information transfer sheets, such as paper and films; fibers and cloth (such as cellulose, nylon, and wool); leather; and color filter bases.

The information transfer sheet is, for example, a surface-treated sheet, specifically, a sheet composed of a base material, such as paper, synthetic paper, or a film, provided with an ink-receiving layer or a sheet not provided with any ink-receiving layer. The ink-receiving layer is disposed, for example, by impregnating or coating the base material with a cationic polymer or by coating the surface of the base material with a porous white inorganic material that can absorb a coloring material in the aqueous ink composition, such as porous silica, alumina sol, or special ceramics, together with a hydrophilic polymer, such as polyvinyl alcohol or polyvinylpyrrolidone. The sheet having such an ink-receiving layer is usually called inkjet exclusive paper (film) or glossy paper (film). Examples of such a sheet include PICTORICO manufactured by Asahi Glass Co., Ltd.; Professional Photo Paper, Super Photo Paper, Matte Photo Paper, glossy Gold, and Platinum Grade manufactured by Canon Inc.; Photo Paper (glossy), Photo Matte paper, and Photo Paper Crispia (high glossy) manufactured by Seiko Epson Corp.; Premium Plus Photo Paper, Premium glossy film, Photo Paper, and Advanced Photo Paper manufactured by Hewlett-Packard Japan, Ltd.; Photolike QP manufactured by Konica Minolta, Inc.; and Kassai Photo Finish Pro manufactured by Fujifilm Corporation.

Examples of the information transfer sheet not provided with any ink-receiving layer include plain paper, fine quality paper, and coated paper. Various types of plain paper according to purposes are commercially available. Examples of commercially available plain paper include both sides fine quality plain paper manufactured by Seiko Epson Corp.; PB PAPER GF-500 manufactured by Canon Inc.; Multipurpose Paper and All-in-one Printing Paper manufactured by Hewlett-Packard Company; inkjet matte paper, DL-9084 (trade name), manufactured by Mitsubishi Paper Mills Limited; and Premium Multipurpose Paper 4024 manufactured by Xerox Corporation. In addition, plain paper copy (PPC) paper is also plain paper.

The aqueous ink composition provides a black image recorded on a record receiving material with excellent clearness, high intensity and print density, and ideal hue. In addition, the aqueous black ink composition of the present invention has significantly high storage stability, not causing solid deposition, changes in physical properties, or change of hue even after storage for a long time.

The aqueous black ink composition of the present invention is used for inkjet recording or a writing instrument. In particular, even when used as an inkjet ink, solid deposition near the nozzle due to drying of the ink composition is hardly caused, and the injector (recording head) is not occluded. In addition, even in the use by recirculation of the ink for relatively long time intervals with a continuous inkjet printer or in the intermittent use with an on-demand inkjet printer, the aqueous black ink composition of the present invention does not cause changes in physical properties.

Furthermore, the image recorded with the aqueous black ink composition of the present invention is excellent in various fastness properties, such as water resistance, humidity resistance, ozone gas resistance, abrasion resistance, and light resistance, in particular, excellent in light resistance and water resistance.

In addition, the recorded material also has excellent long-term storage stability, in particular, significantly excellent light resistance and water resistance in addition to excellent hue on plain paper. The recorded material also has excellent color developing properties, such as intensity, brightness, and print density, color rendering properties, and sensor corresponding properties in the near infrared light region.

EXAMPLES

The present invention will now be described more specifically by way of examples, which however, should not be construed as limiting the invention thereto. In each structural formula of the compounds prepared in examples, the acid functional groups, such as the sulfo group, are each shown in its free acid form.

(A) Synthesis of Compound Represented by Formula (1)

Synthesis Examples 1 to 3

Compounds represented by the following Formulae (22), (23), and (26) are each synthesized in accordance with the method described in PTL 3.

[Chem. 8]

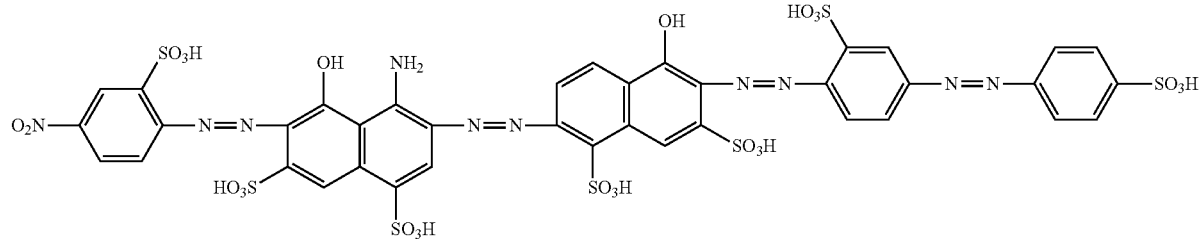

(22)

[Chem. 9]

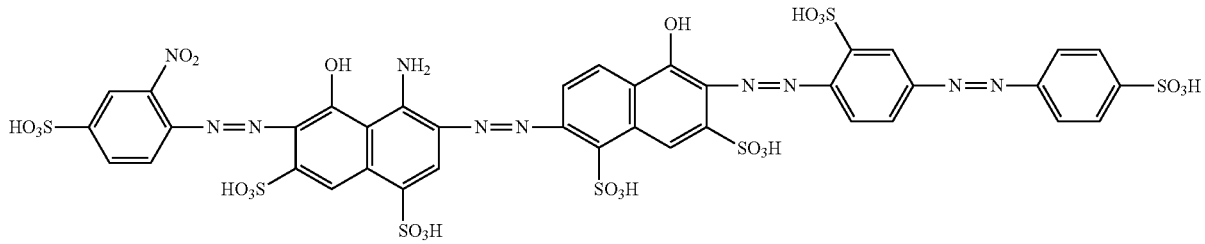

(23)

[Chem. 10]

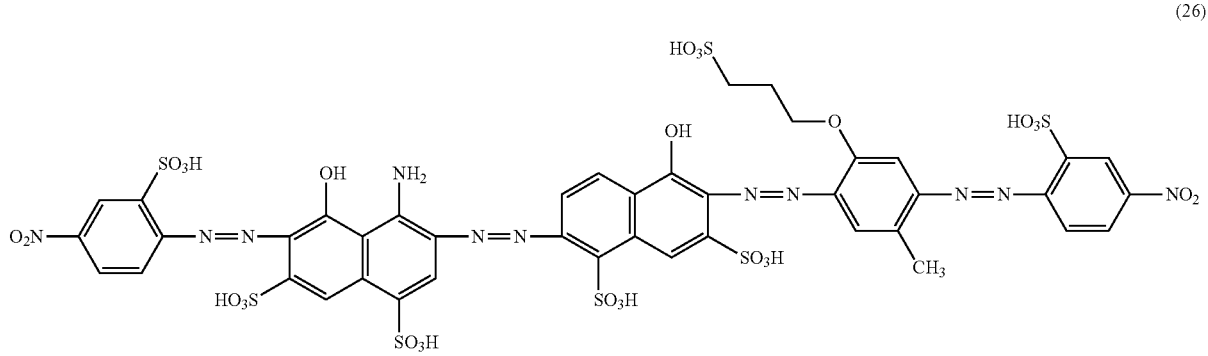

(26)

(B) Preparation of Aqueous Ink Composition

Examples 1 to 7 and Comparative Examples 1 and 2

Components shown in Table 6 were mixed with stirring for about 1 hr to prepare respective solutions. The solutions were each filtered through a membrane filter of a 0.45 μm pore size (trade name: Cellulose Acetate Filter Paper, manufactured by Advantec Co., Ltd.) to prepare aqueous ink compositions for evaluation test. Note that the numerical value of each component shown in Table 6 means "part(s)".

The abbreviations in Table 6 have the following meanings:
ABk2: C.I. Acid Black 2,
DB199: C.I. Direct Blue 199,
DB86: C.I. Direct Blue 86,
AB249: C.I. Acid Blue 249,
AB90: C.I. Acid Blue 90,
DR227: C.I. Direct Red 227,
DO39: C.I. Direct Orange 39,
Gly: glycerin,
2-Py: 2-pyrrolidone,
IPA: isopropanol,
Bca: butyl carbitol,
SF440: Surfynol® 440, and
TEA: triethanolamine.

TABLE 6

| Component | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| Formula (22) | 3.6 | 1.2 | 1.2 | 2.6 | 3.0 | 2.1 | 2.1 | 2.1 | 2.5 |
| ABk2 | — | 2.6 | 2.6 | 1.2 | 2.2 | 2.1 | 2.1 | 2.1 | 2.5 |
| DB199 | 0.8 | 0.5 | 0.8 | 0.8 | 1.0 | — | — | — | — |
| DB86 | — | — | — | — | — | 0.2 | — | — | — |
| AB249 | — | — | — | — | — | — | 0.2 | — | — |
| AB90 | — | — | — | — | — | — | — | 0.2 | — |
| DR227 | 0.6 | 0.5 | 0.4 | 0.8 | — | 0.8 | 0.8 | 0.8 | — |
| DO39 | 1.25 | 1.4 | 1.2 | 0.8 | — | 1.0 | 1.0 | 1.0 | — |
| Gly | 5 | 5 | 5 | 5 | 5 | 5 | 5 | 5 | 5 |
| Urea | 5 | 5 | 5 | 5 | 5 | 5 | 5 | 5 | 5 |
| 2-Py | 4 | 4 | 4 | 4 | 4 | 4 | 4 | 4 | 4 |
| IPA | 3 | 3 | 3 | 3 | 3 | 3 | 3 | 3 | 3 |
| Bca | 2 | 2 | 2 | 2 | 2 | 2 | 2 | 2 | 2 |
| SF440 | 0.1 | 0.1 | 0.1 | 0.1 | 0.1 | 0.1 | 0.1 | 0.1 | 0.1 |
| TEA | 0.1 | 0.1 | 0.1 | 0.1 | 0.1 | 0.1 | 0.1 | 0.1 | 0.1 |
| Water | Balance | | | | | | | Balance | |
| Total | 100 | 100 | 100 | 100 | 100 | 100 | 100 | 100 | 100 |

(C) Inkjet Recording

The aqueous ink composition prepared in each of Examples and Comparative Examples was used in inkjet recording with an inkjet printer, trade name PX105, manufactured by Seiko Epson Corp. on the following plain paper 1:

Plain paper 1: Premium Multipurpose Paper 4024 manufactured by Xerox Corporation.

In the inkjet recording, image patterns of six concentrations of 100%, 80%, 60%, 40%, 20%, and 10% were formed to provide six-grade tones to give a recorded material with gradation from thick black to thin black. This was used as a test piece in the following evaluation test.

(D) Colorimeter and Conditions for Colorimetry

When the following evaluation test needs to perform colorimetry, the colorimetry was performed with the following colorimeter under the following conditions:
Colorimeter: manufactured by GRETAG-MACBETH AG, trade name: SpectroEye,
Conditions for colorimetry: concentration standard: ANSI A, viewing angle: 20, light source: D50.

(E) Test of Light Resistance

Each of the test pieces of Examples and Comparative Examples prepared in the "(C) Inkjet recording" was naturally dried for 24 hr. The dried test piece was set in a xenon weather meter XL75 (manufactured by Suga Test Instruments Co., Ltd.), and was irradiated at a temperature of 24° C., a humidity of 60% RH, an intensity of 100 kLux for 72 hr. After completion of the irradiation, the color of each test piece was measured to determine the color difference ($\Delta E$) between before and after the irradiation. Note that a smaller color difference $\Delta E$ means a smaller change in hue by light and indicates higher light resistance.
AA: $\Delta E<3.0$
A: $3.0<\Delta E<4.0$
B: $4.0<\Delta E<8.0$
C: $8.0<\Delta E$ The results are shown in Table 7.

(G) Test of Water Resistance

Each of the test pieces of Examples and Comparative Examples prepared in the "(C) Inkjet recording" was naturally dried for 24 hr. The dried test piece was immersed in deionized water for 10 min, was then slowly taken out from the water, and was naturally dried for 24 hr. The color of each test piece was measured to calculate the survival rate (%) of the Dk value after the test. Note that a larger survival rate (%) means a smaller fade in color due to water and indicates excellent water resistance.
AA: a survival rate after the test of 60% or more
A: a survival rate after the test of 50% or more and less than 60%
B: a survival rate after the test of 40 or more and less than 50%
C: a survival rate after the test of less than 40%

The results are shown in Table 7.

TABLE 7

| Result of test | Example | | | | | | | Comparative Example | |
|---|---|---|---|---|---|---|---|---|---|
| | 1 | 2 | 3 | 4 | 5 | 6 | 7 | 1 | 2 |
| (E) Light resistance | A | AA | AA | A | AA | A | A | C | A |
| (G) Water resistance | AA | A | A | A | A | A | A | A | B |

As obvious from the results shown in Table 7, the light resistance and the water resistance were excellent in each Example, compared to those in each Comparative Example.

INDUSTRIAL APPLICABILITY

The aqueous ink composition of the present invention has excellent light resistance and water resistance and is therefore extremely suitably used in a variety of recordings, in particular, in inkjet recording.

The invention claimed is:

1. An aqueous ink composition comprising at least, as colorants, both a compound represented by Formula (1) or its salt or a mixture thereof and a colorant having a maximum absorption wavelength λmax in a range of 560 to 680 nm and having a phthalocyanine skeleton,

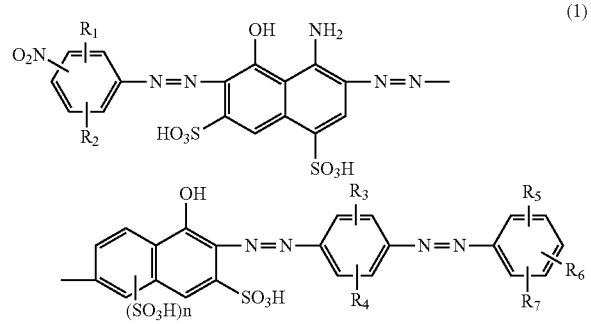

(1)

wherein $R_1$, $R_2$, $R_5$, $R_6$, and $R_7$ each independently represents a group selected from the group consisting of a hydrogen atom, a halogen atom, a cyano group, a hydroxy group, a carboxy group, a sulfo group, a sulfamoyl group, a nitro group, an alkoxy group optionally having a substituent, an alkylsulfonyl group optionally having a substituent, an alkyl group, an arylsulfamoylamino group optionally having a substituent, and an alkylcarbonylamino group;

$R_3$ and $R_4$ each independently represents a group selected from the group consisting of a hydrogen atom, a halogen atom, a cyano group, a sulfo group, a carboxy group, a nitro group, an alkoxy group optionally having a substituent, and an alkyl group; and n represents 0 or 1.

2. The aqueous ink composition according to claim 1, further comprising an azo colorant having a maximum absorption wavelength λmax of not higher than 580 nm, wherein said azo colorant is different from both the compound represented by Formula (1) or its salt and the colorant having a phthalocyanine skeleton.

3. The aqueous ink composition according to claim 1, further comprising a compound represented by Formula (2) as a pH adjuster,

(2)

wherein $R_8$, $R_9$, and $R_{10}$ each independently represents a hydrogen atom, an alkyl group, a hydroxyalkyl group, or a hydroxyalkoxyalkyl group.

4. The aqueous ink composition according to claim 1, wherein the colorant having a phthalocyanine skeleton is at least one dye selected from the group consisting of C.I. Acid Blue 249, C.I. Direct Blue 86, C.I. Direct Blue 87, and C.I. Direct Blue 199.

5. The aqueous ink composition according to claim 1, wherein in Formula (1), $R_1$ represents a carboxy group or a sulfo group; $R_2$ represents a hydrogen atom; $R_6$ represents a nitro group, a carboxy group, or a sulfo group; and n represents 1.

6. The aqueous ink composition according to claim 1, wherein in Formula (1), $R_1$ and $R_3$ each represent a sulfo group; $R_4$ represents a hydrogen atom; $R_5$ represents a hydrogen atom or a nitro group; $R_6$ represents a nitro group, a carboxy group, or a sulfo group; $R_7$ represents a hydrogen atom; and n represents 1.

7. An inkjet recording method comprising: discharging a droplet of the aqueous ink composition according to claim 1 according to a recording signal; and allowing the droplet to adhere to a record receiving material.

8. The inkjet recording method according to claim 7, wherein the record receiving material is an information transfer sheet.

9. A colored material colored with the aqueous ink composition according to claim 1.

10. An inkjet printer loaded with a container containing the aqueous ink composition according to claim 1.

* * * * *